United States Patent [19]
Smith

[11] Patent Number: 5,377,206
[45] Date of Patent: Dec. 27, 1994

[54] MULTIPLE-CHANNEL FAULT-TOLERANT CLOCK SYSTEM

[75] Inventor: Frederick L. Smith, Largo, Fla.

[73] Assignee: Honeywell Inc., Minneapolis, Minn.

[21] Appl. No.: 12,835

[22] Filed: Feb. 3, 1993

[51] Int. Cl.$^5$ .............................................. G06F 11/08
[52] U.S. Cl. ...................................... 371/36; 371/61; 395/575; 326/35; 327/292
[58] Field of Search ................... 371/9.1, 61, 68.3, 48, 371/36; 331/47, 49, 9; 307/219, 362, 543, 269, 272.2, 464; 395/575

[56] References Cited

U.S. PATENT DOCUMENTS

| | | |
|---|---|---|
| 3,522,455 | 8/1970 | Thomas et al. |
| 3,662,277 | 5/1972 | White |
| 4,239,982 | 12/1980 | Smith et al. |
| 4,644,498 | 2/1987 | Bedard et al. ........................ 364/900 |
| 4,667,328 | 3/1987 | Imran ..................................... 371/61 |
| 4,683,570 | 7/1987 | Bedard et al. |
| 4,788,670 | 11/1988 | Hofmann et al. ...................... 371/68 |
| 4,839,855 | 6/1989 | Van Driel ............................. 371/61 |
| 4,899,351 | 2/1990 | Bonke ................................... 371/61 |
| 4,920,540 | 4/1990 | Baty ...................................... 371/61 |
| 4,979,191 | 12/1990 | Bond et al. |
| 4,984,241 | 1/1991 | Truong |
| 5,202,822 | 4/1993 | McLaughlin et al. ............... 371/9.1 |

FOREIGN PATENT DOCUMENTS

0176464A3 4/1986 European Pat. Off.
WO92/12576 7/1992 WIPO.

OTHER PUBLICATIONS

Tsuchimura et al. 'Fault Tolerant IC Chip for Crystal Oscillators' 1991 IEEE pp. 232–237.

Van Allen et al. 'An All Digital Phase Locked Loop Fault Tolerant Clock' 1991 pp. 3170–3173.

Ricky W. Butler, "Fault-Tolerant Clock Synchronization Techniques for Avionics Ssytems", Sep. 7–9, 1988, AIAA/AHS/ASEE Aircraft Design, Systems and Operations Meeting, Atlanta, Ga.

Ricky W. Butler, "A Survey of Provably Correct Fault-Tolerant Clock Synchronization Techniques", Feb. 1988, NASA Technical Memorandum 100553.

Ricky W. Butler, Daniel L. Palumbo, and Sally C. Johnson, "Fault–Tolerant Clock Synchronization Validation Methodology", Copyright 1987 American Institute of Aeronautics and Astronautics, Inc.

Ricky W. Butler and Sally C. Johnson, "Validation of a Fault-Tolerant Clock Synchronization System", 1984, NASA Technical Paper 2346.

Daniel Davies and John F. Wakerly, "Synchronization and Matching in Redundant Systems", Copyright 1978 IEEE, IEEE Transactions on Computers, vol. C–27, No. 6, Jun. 1978.

C. M. Krishna, Kang G. Shin, and Ricky W. Butler, "Ensuring Fault Tolerance of Phase-Locked Clocks", Copyright 1985 IEEE, IEEE Transactions on Computer vol. C–34, No. 8, Aug. 1985.

Albert L. Hopkins, Jr., T. Basil Smith, III, Jaynarayan H. Lala, "FTMP– A Highly Reliable Fault-Tolerant Multiprocessor for Aircraft", Proceedings of the IEEE, vol. 66, No. 10, Oct. 1978.

(List continued on next page.)

Primary Examiner—Robert W. Beausoliel, Jr.
Assistant Examiner—Albert Decady
Attorney, Agent, or Firm—John G. Shudy, Jr.

[57] ABSTRACT

A fault-tolerant clock having at least four channels, each providing its own clock output, and yet all clock output signals of all functioning channels being coherent with one another. One clock functions as a master with the other clocks of the remaining channels slaving themselves to that one clock. In view of a failure of the master, another clock reigns as the master clock to slave the remaining clocks. If the next master clock fails, then still another clock becomes a master to slave the remaining clock or clocks. The clocks are independently powered such that complete failure of one clock, including its power, does not necessarily prevent the other clocks from providing coherent outputs.

12 Claims, 14 Drawing Sheets

OTHER PUBLICATIONS

Jennifer Lundelius and Nancy Lynch, "A New Fault-Tolerant Algorithm for Clock Synchronization", Jul. 1984, Laboratory for Computer Science, Massachusetts Institute of Technology, MIT/LCS/TM-265 AD-A154 771.

T. Basil Smith, "Fault-Tolerant Clocking System", 1981 IEEE, pp. 262–264.

Harro L. Hartmann, Erhard Steiner, "Synchronization Techniques for Digital Networks", IEEE Journal on Selected Areas in Communications, vol., SAC-4, No. 4, Jul. 1986.

J. L. Kessels, "Two Designs of a Fault-Tolerant Clocking System", IEEE Transactions on Computers, vol. C-33, No. 10, Oct. 1984.

Leslie Lamport, Robert Shostak, and Marshall Pease, "The Byzantine Generals Problems", ACM Transactions on Programming Languages and Systems, vol. 4, No. 3, Jul. 1982, pp. 382–401.

Leslie Lamport and P. M. Melliar-Smith, "Synchronizing Clocks in the Presence of Faults", Journal of the Association for Computing Machinery, vol. 32, No. 1, Jan. 1985, pp. 52–78.

Leslie Lamport, P. M. Melliar-Smith, "Byzantine Clock Synchronization", the Proceedings of Third ACM Symposium on Principles of Distribute of Computing, 1984.

P. Thambidurai, A. M. Finn, R. M. Kieckhafer, C. J. Walter, "Clock Synchronization in Maft", 19th IEEE International Symposium on Fault-Tolerant Computing, 1989.

Kang G. Shin and P. Ramanathan, "Transmission Delays in Hardware Clock Synchronization", IEEE Transactions on Computers, vol. 37, 1988.

N. Vasanthavada, P. Thambidurai, P. N. Marinos, "Design of Fault-Tolerant Clocks with Realistic Failure Assumptions", 19th IEEE International Symposium on Fault-Tolerant Computing, 1989.

Nagesh Vasanthavada, Peter N. Marinos, "Synchronization of Fault-Tolerant Clocks in the Presence of Malicious Failures", in IEEE Transactions on Computers, vol. 37, 1988.

Ricky W. Butler, Daniel L. Palumbo, Sally C. Johnson, "Application of a Clock Synchronization Validation Methodology to the Sift Computer System", the IEEE 15th International Symposium on Fault-Tolerant Computing, 1985.

Anatol W. Holt and John M. Myers, "An Approach to the Analysis of Clock Networks", NASA Contract Report 166028, 1982.

Emil Sappl and Anita Zimmermann, "Navigation Experiment Navex Experimental Results of Clock Synchronisation", Translation in European Space Agency, ESA-TT-1084, Oct. 1987.

| INPUTS | | | OUTPUTS | |
|---|---|---|---|---|
| 1 | 2 | 3 | 61 | 60 |
| PASS | X | X | LOW | LOW |
| FAIL | PASS | X | LOW | HIGH |
| FAIL | FAIL | PASS | HIGH | LOW |
| FAIL | FAIL | FAIL | HIGH | HIGH |

X = DON'T CARE

Fig. 8

| INPUTS | | | OUTPUTS | |
|---|---|---|---|---|
| 1 | 2 | 3 | 75 | 65 |
| PASS | X | X | 71 | 81 |
| FAIL | PASS | X | 72 | 82 |
| FAIL | FAIL | PASS | 73 | 83 |
| FAIL | FAIL | FAIL | 74 | 84 |

X = DON'T CARE

MULTIPLE-CHANNEL FAULT-TOLERANT CLOCK SYSTEM

BACKGROUND OF THE INVENTION

The present invention pertains to clocks for digital processing devices, and particularly pertains to fault tolerant clocks having several channels.

SUMMARY OF THE INVENTION

The present invention provides a fault tolerant clock that is suitable for use in a variety of applications where synchronized, independently derived timing signals are required. Features of this clock include multiple channels wherein each channel can be packaged in a separate module and be independently powered, and that the clock has no single point failures. The device has a quadruplex fault tolerant clock which provides coherent clock pulses at the output of each of the four channels if there are no faults present. The clock will provide coherent outputs on at least two of the four channels in the presence of any two faults. Depending on the exact nature of the faults, the clock may still provide coherent outputs on all four channels in the presence of any number of faults. The clock has a hierarchical ordering wherein one of the channels acts as the master oscillator and the other channels slave themselves to the master in a coherent fashion. The master/slave designation of each channel is determined by the wiring at the inputs of the respective modular sine wave oscillator. The present quadruplex clock provides two-fault tolerance. The clock may be down-scaled to a triplex configuration providing a single fault tolerant capability. This may be achieved by ignoring the provisions for the third companion or by omitting the associated circuitry. The clock may also be expanded to provide for more than four channels. The present invention fulfills the need for a coherent fault tolerant clock which is required in nearly all modular redundant systems. The present clock does not have any of the uncertainties related to output frequency that often occur when propagation delays are introduced into the feedback loop of cross-strapped oscillators. Furthermore, the present clock does not have any tendency to hunt around the nominal frequency as is often the case with interlocked phase-lock loop designs.

BRIEF DESCRIPTION OF THE DRAWINGS

FIG. 8 is a truth table of the multiplexer signal selector.

FIG. 9 is a resultant truth table of the truth tables of FIGS. 3 and 8.

DESCRIPTION OF THE PREFERRED EMBODIMENT

Figure 1:
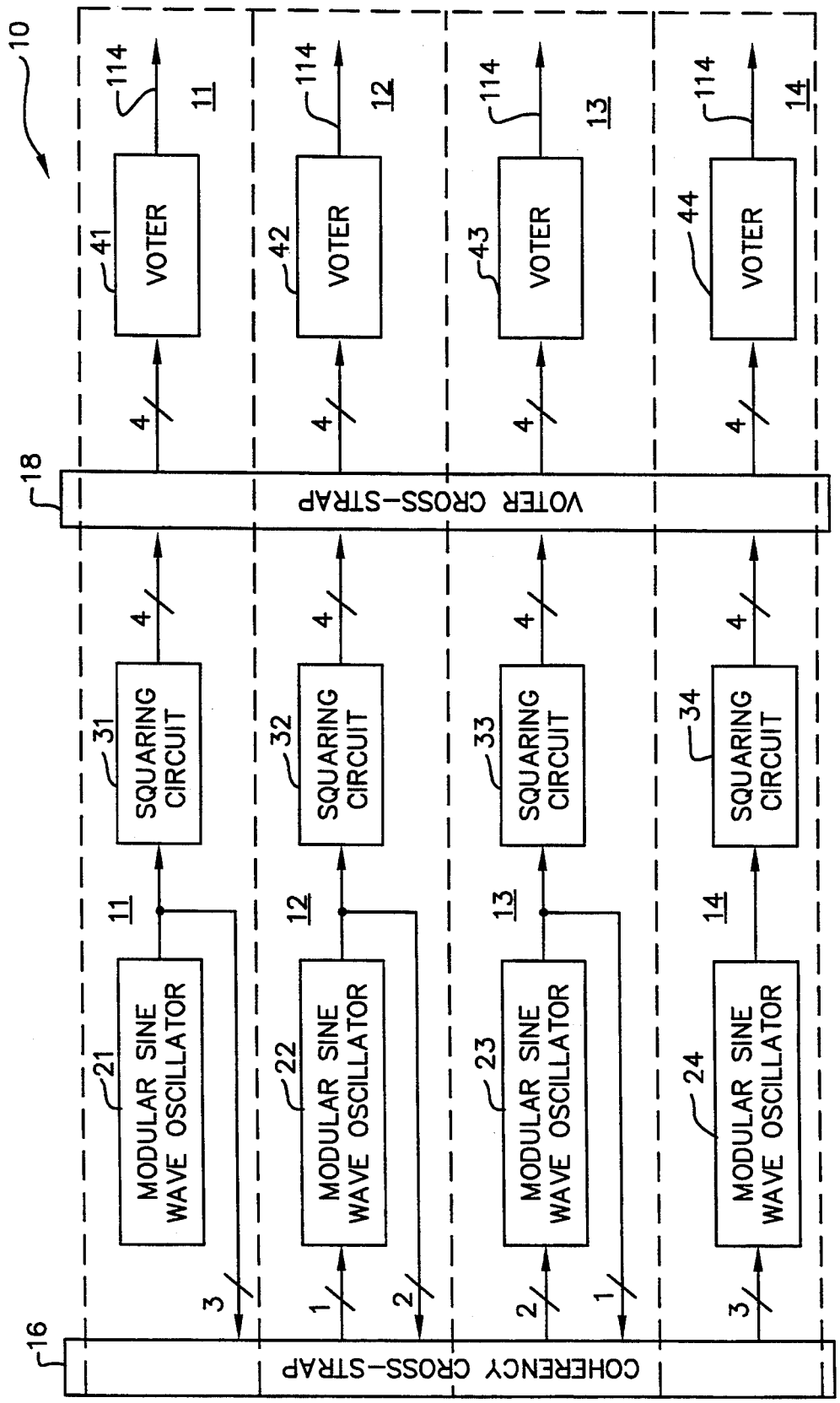
FIG. 1 is a block diagram of the two fault tolerant clock.

FIG. 1 is a block diagram of two-fault tolerant clock 10. Clock 10 has four channels 11, 12, 13 and 14, and two cross-strap devices 16 and 18 that provide for inter-channel signal connections. Each channel 11, 12, 13 and 14, respectively, has a modular sine wave oscillator 21, 22, 23 and 24, a squaring circuit 31, 32, 33 and 34, and a voter 41, 42, 43 and 44. Each of the four channels 11, 12, 13, 14 considers itself to be the local unit and refers to the other three channels as companion units.

Figure 2A:
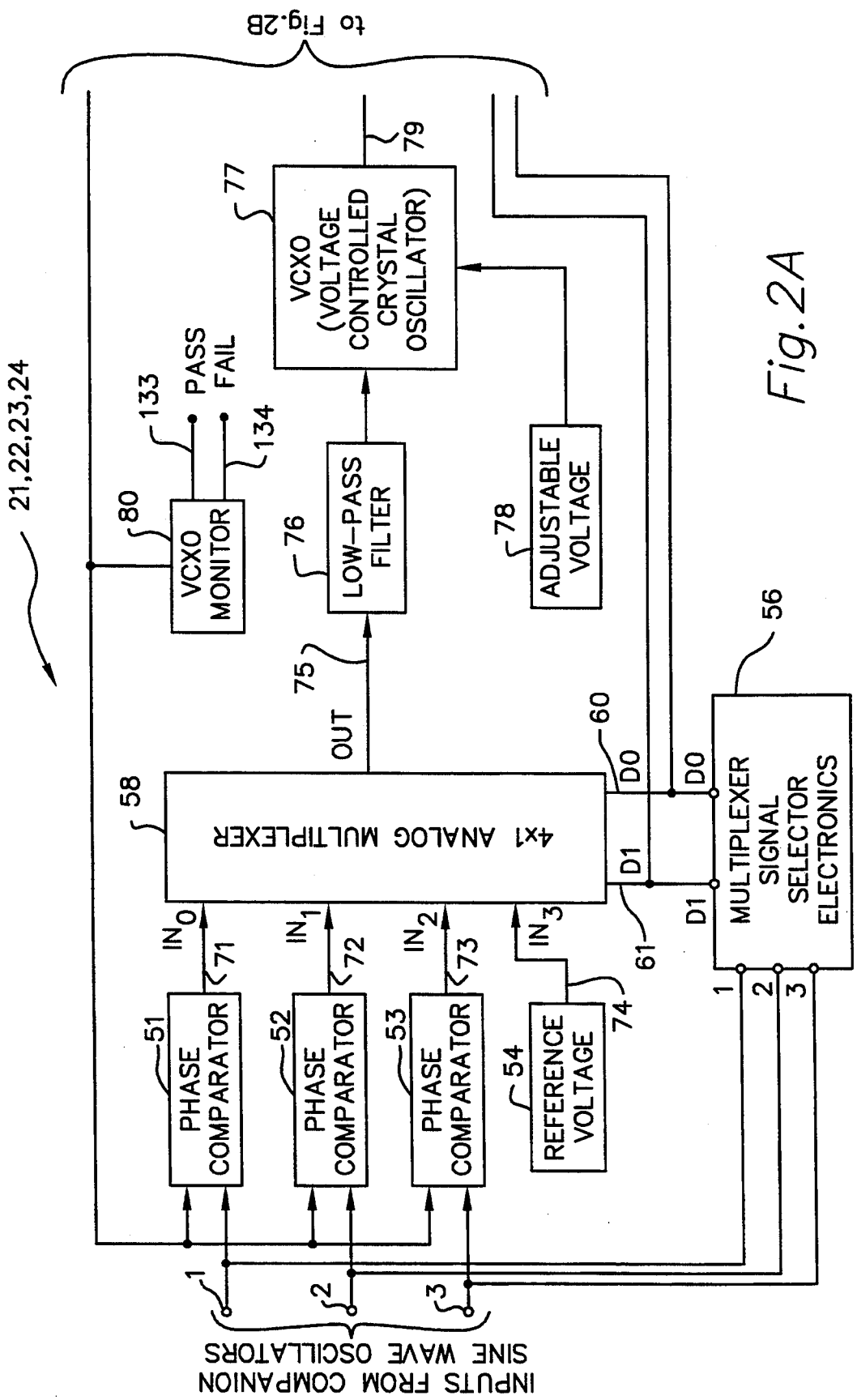
FIG. 2 is a diagram of the modular sine wave oscillator.
Figure 2B:
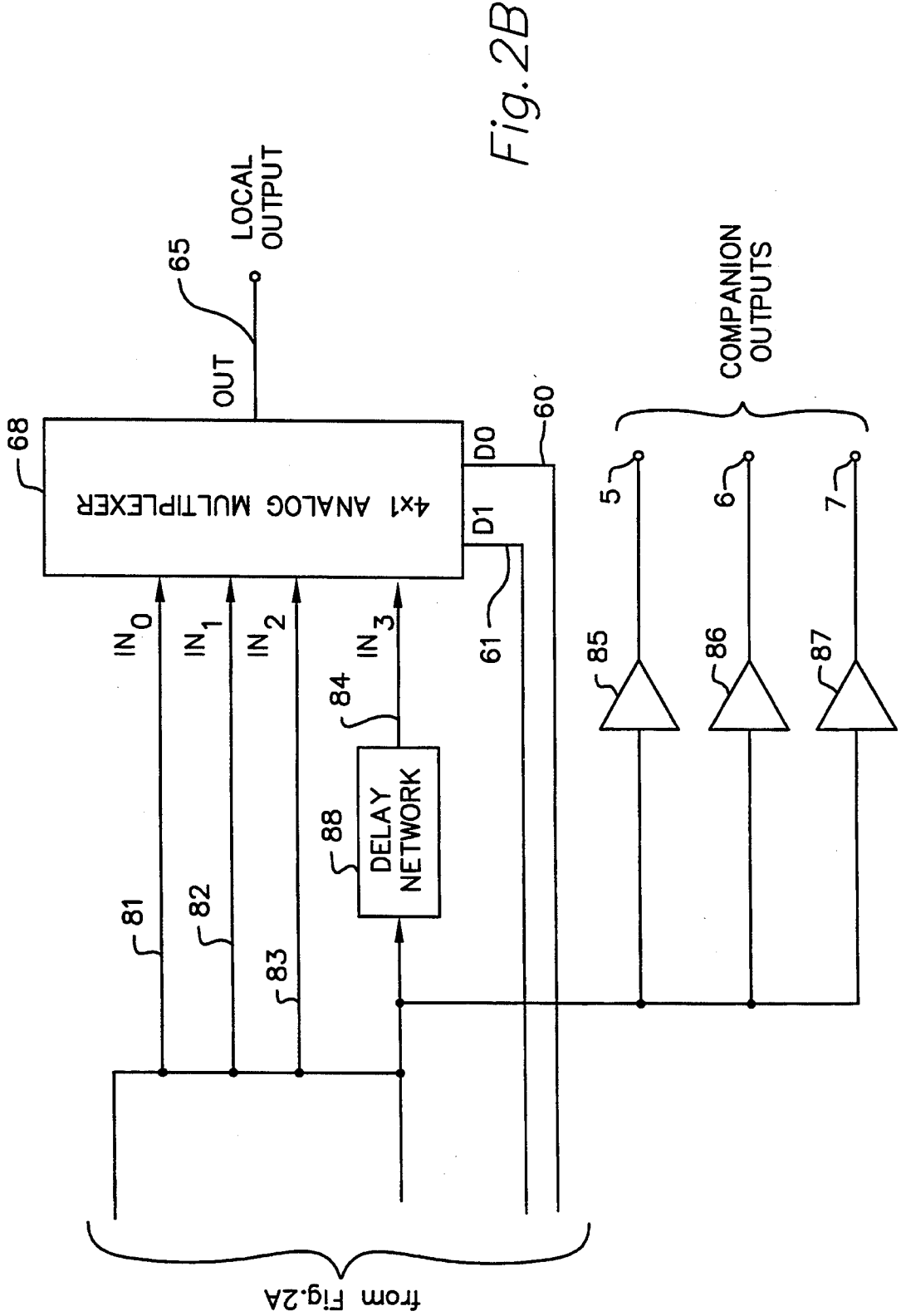

FIG. 2 reveals details of sine wave oscillator electronics for modulator sine wave oscillators 21, 22, 23 and 24. Each of phase/frequency comparators 51, 52 and 53 may have a two-transformer and four-diode arrangement which is commonly referred to as a double-balanced mixer, or it may have a solid-state device based on an exclusive-OR configuration.

Figure 4:
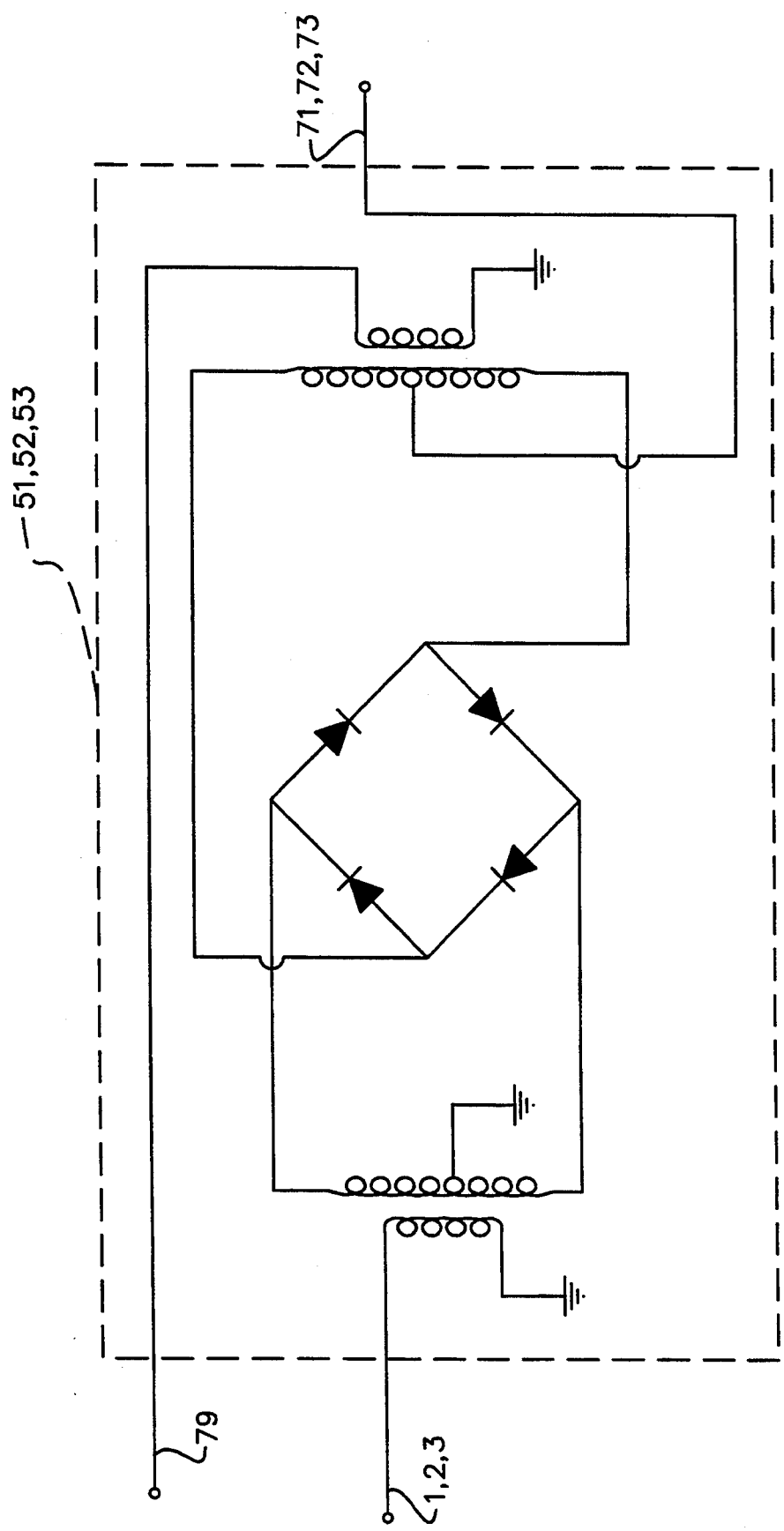
FIG. 4 is a schematic of a double-balanced mixer.
Figure 5:
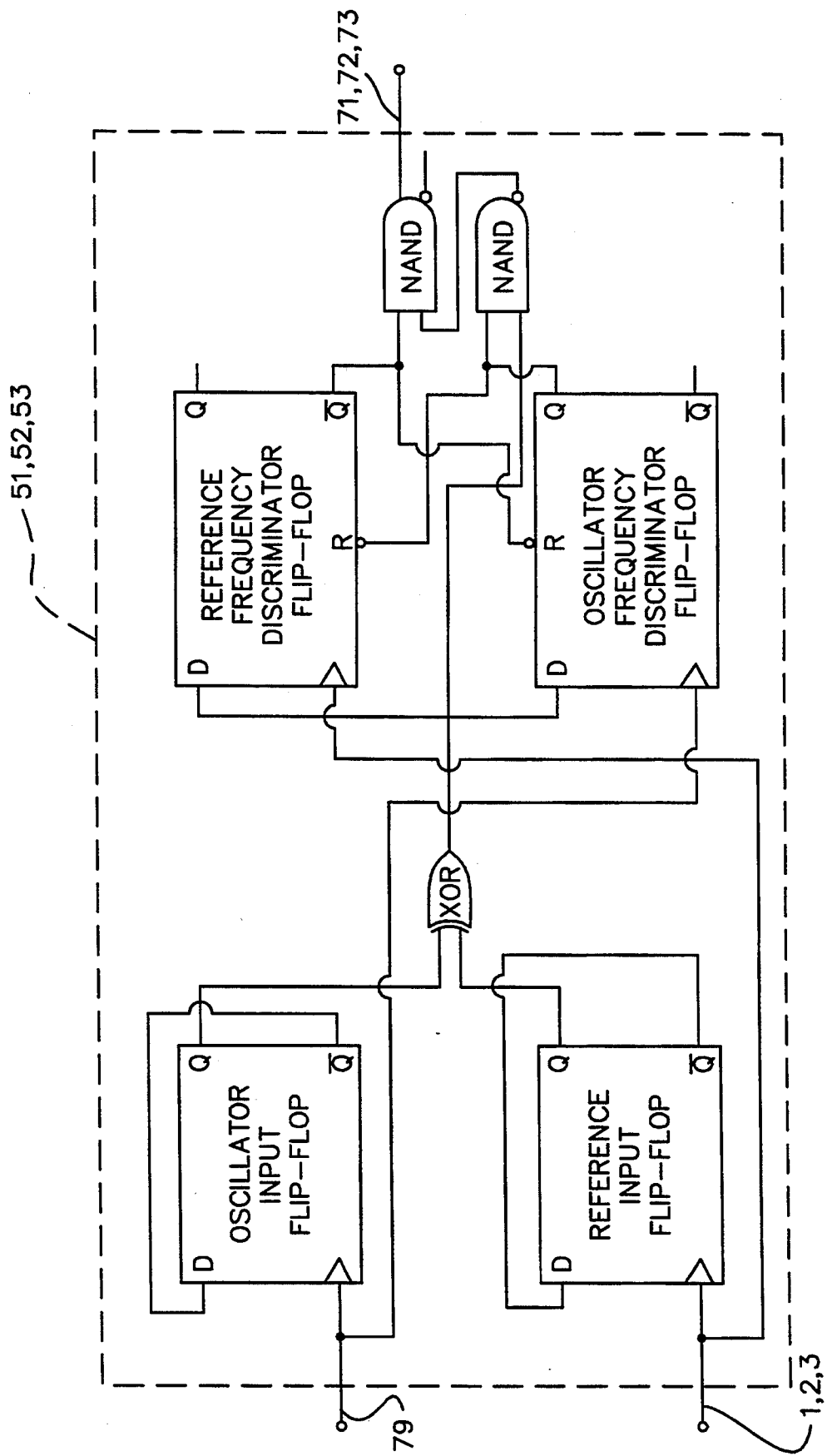
FIG. 5 is a diagram of a digital phase/frequency discriminator.

FIG. 4 is a schematic of the double-balanced mixer and FIG. 5 is a schematic of a solid-state comparator having four flip-flops, two NAND gates and an exclusive-OR gate. The double-balanced mixer may be obtained from Mini-Circuits on 2625 E. 14th St. in Brooklyn, N.Y. The solid-state device is an ANALOG DEVICES model AD9901. Either device may be used as comparators 51, 52 and 53. Comparator 51, 52, or 53 is sensitive to a phase/frequency difference between a reference signal 1, 2, or 3, respectively, and the oscillator 80 signal 79. Comparator 51, 52 or 53 outputs a direct current (DC) signal 71, 72 or 73 that is proportional to the phase/frequency difference between signals 79 and 1, 2 or 3. Output 71, 72 or 73 goes through multiplexer 58 to terminal 75. The DC voltage signal 75, may have a small amount of ripple which is filtered out by low-pass filter 76. The DC voltage signal from filter 76 goes to control oscillator 77 which varies in frequency in accordance with the DC voltage. Oscillator 77 varies in frequency so as to reduce or null the DC voltage input to a minimum or zero. This feedback 79 to comparator 51, 52 or 53 results in signals 79 and 1, 2 or 3 to be in phase and at the same frequency, and thereby are coherent. Therefore, output 79 of oscillator 77 is slaved to a master oscillator signal 1, 2 or 3. A nominal frequency of signals 79, 1, 2 and 3 is approximately 30 megahertz. Adjustable voltage 78 provides an offset voltage to eliminate the offset of output signal 71, 72 or 73 from comparator 51, 52 or 53. Oscillator 77 may be a VECTRON model CO-484V. If a DC reference voltage 54 signal 74 is selected by multiplexer 58 to be fed through filter 76 to oscillator 77, then oscillator 77 functions as a master oscillator.

Phase/frequency comparators 51, 52 and 53 have an input from each of the other three sine wave oscillators of module 21, 22, 23 or 24. These three inputs from companion sine wave oscillators of these modules are input to multiplexer signal selector 56. The outputs of phase/frequency comparators 51, 52 and 53 go to a four-by-one analog multiplexer 58. Also, a reference voltage 54 is connected to an input 74 of multiplexer 58. Four-input-by-one-output analog multiplexer 58 is commonly available from a number of semiconductor venders. Multiplexer 58 connects one of four inputs 71, 72, 73 and 74, which may be an output, respectively, from comparator 51, comparator 52, comparator 53, or reference voltage 54 to output terminal 75. The particular input which is selected by multiplexer 58 is determined by logical inputs 60 and 61. The output of phase/frequency comparator 51 goes to input 71, the output of phase/frequency comparator 52 goes to input 72, the output of phase/frequency comparator 53 goes to input 73, and the output of reference voltage 54 goes to input 74 of multiplexer 58.

Figure 3:
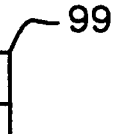
FIG. 3 is a truth table of the four-by-one multiplexer.

FIG. 3 shows truth table 99 of multiplexer 58 with respect to control inputs 61 and 60, and inputs 71, 72, 73 and 74, for the selection of which input is put on output 75. Truth table 99 also applies to control inputs 60 and 61 at multiplexer 68 for the porting of a signal from one of the inputs 81, 82, 83 and 84, to local output 65.

Output 75 of multiplexer 58 goes to low pass filter 76. Low pass filter 76 may be a resistor-capacitor lag network with a relatively long time constant or may be an analog-integrator type of circuit. Filter 76 provides a high degree of filtering. The output of filter 76 goes on to a voltage controlled crystal oscillator 77. Oscillator 77 has a nominal accuracy of a certain percentage expressed in parts-per-million (PPM) which is a function of the target application. Oscillator 77 has an adjustable range of approximately three times its nominal parts-per-million rating. A typical rating is 50 parts-per-million. The adjustable offset range is under control of an external variable voltage 78 connected to oscillator 77. Output 79 from oscillator 77 goes to phase/frequency comparators 51, 52 and 53. Output 79 also goes to inputs 81, 82 and 83 of four-by-one analog multiplexer 68, and goes through inverters 85, 86 and 87, whose outputs 5, 6 and 7 are companion outputs to the other three modular sine wave oscillators of the group of oscillators 21, 22, 23 and 24. Output 79 goes on to delay network 88 which may be a resistor-capacitor (RC) circuit. Delay network 88 duplicates the delays that may be introduced by any isolation that may have to be added in the coherency cross-strapping element 16 or 18 to avoid common point failures. 10 Isolation networks are shown in FIG. 2 as buffer amplifiers 85, 86 and 87 in series with each of the companion outputs 5, 6 and 7. These amplifiers or networks 85, 86 and 87 are application dependent and may vary in nature. Delay network 88 may be a replication of isolation device 85, 86 or 87, and thus provides an appropriate compensating delay.

Output 79 also goes to voltage controlled crystal oscillator monitor 80 which is a frequency sensitive device. Monitor 80 provides a pass 133 or fail 134 signal as to the performance of oscillator 77. The output of delay network 88 which replicates the delay of buffer amplifiers 85, 86 and 87, has an output 84 that goes on to a four-by-one analog multiplexer 68. The selection of signals 81, 82, 83 and 84 as a local output 65 from oscillator 21, 22, 23 or 24, is dictated by signals on inputs 60 and 61 in accordance with multiplexer truth table 99 shown in FIG. 3. Signals 60 and 61 are from multiplexer signal selector 56 which receives inputs from three companion modular sine wave oscillators from the group of oscillators 21, 22, 23 and 24, excluding the local oscillator. The three signals from these companion oscillators provide the selector signals 60 and 61 to multiplexers 58 and 68 via multiplexer signal selector electronics 56.

Figure 6:
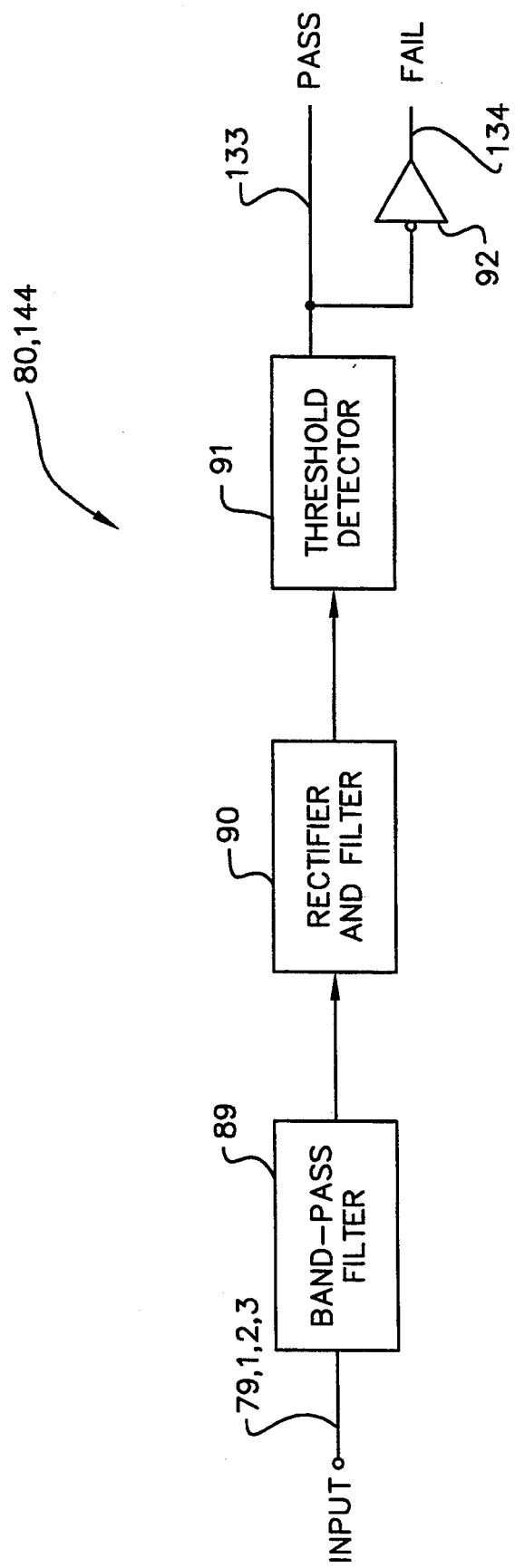
FIG. 6 is a diagram of the monitor.

FIG. 6 is a diagram of the voltage controlled crystal oscillator monitor 80. Monitor 80 has output 79 of oscillator 77 connected to the input of band-pass filter 89. Band-pass filter 89 has a very narrow pass band so that any signals appearing at input 79 must be very close to their nominal value in order to pass through filter 89. Filter 89 may be a resistor-capacitor type, an inductor-capacitor type, or else a multi-pole crystal type of filter. In any event, filter 89 has a high "Q" value. The output of band-pass filter 89 goes on to rectifier/filter 90 which has a half-wave, a full-wave, or a bridge type of rectifier using diodes and capacitors, or an operational-amplifier based absolute value circuit. The output of rectifier/filter 90 is a direct current (DC) voltage that is proportional to the frequency of the signal passed by band-pass filter 89. The output of rectifier/filter 90 goes on a threshold detector 91. Threshold detector 91 may be an operational amplifier-based comparator or another device having an accurate level of discriminator capability. An output 133 of threshold detector 91 having a high signal indicates that the frequency of the input signal of monitor 80 is within prescribed bounds of its nominal value and a low on output 133 of detector 91 indicates that the frequency of the input signal is not within prescribed bounds of its nominal value. Output 133 of detector 91 is also inverted by inverter 92 so that a high on output 134 of inverter 92 indicates a fail in contrast to output 133 directly from detector 91 which has a high to indicate a pass on the frequency of the input signal on line 79 to monitor 80. Each oscillator circuit 21, 22, 23 and 24, has four monitors; one is a voltage controlled crystal oscillator monitor 80 connected to output 79 of oscillator 77, and the other three monitors 144 are part of multiplexer signal selector 56. Monitor 144 has the same circuit as monitor 80 of FIG. 6.

Figure 7:
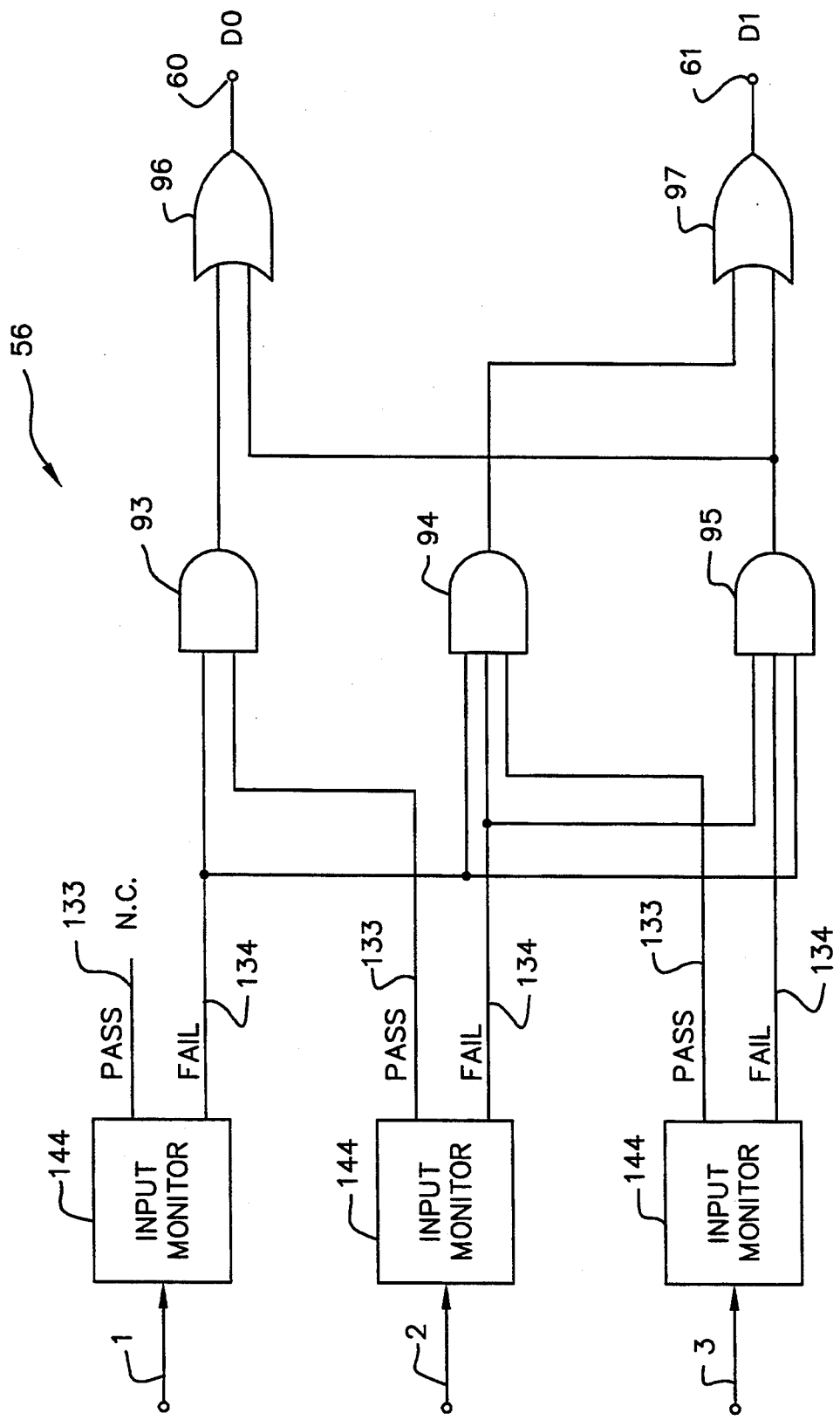
FIG. 7 is a diagram of the multiplexer signal selector.

FIG. 7 is a diagram of multiplexer signal selector 56. Inputs 1, 2 and 3 of monitors 144 are connected to correspondingly appropriate companion outputs of buffers 85, 86 and 87 of the other three companion modulator sine wave oscillators of the group of modular oscillators 21, 22, 23 and 24. Pass output 133 of monitor 144 connected to input 1, is not connected. Fail output 134 of monitor 144 connected to input 1, is connected to an input of each of AND gates 93, 94 and 95. Monitor 144 connected to input 2, has a pass output 133 connected to an input of AND gate 93, and has a fail output 134 connected to an input of AND gates 94 and 95. Monitor 144 connected to input 3, has a pass output 133 connected to an input of AND gate 94, and has a fail output 134 connected to an input of AND gate 95. The output of AND gate 93 goes to an input of OR gate 96. The output of AND gate 94 goes to input of OR gate 97. The output of AND gate 95 goes to an input of OR gate 96 and to an input of OR gate 97. OR gate 96 has an output 60 and OR gate 97 has an output 61 corresponding to those outputs 60 and 61 of multiplexer signal selector 56.

FIG. 8 is a truth table 98 for selector 56 with respect to inputs 1, 2 and 3 and the resultant outputs 60 and 61. Truth table 98 shows a particular set of output 10 signals 60 and 61 for a given combination of input signals to input monitors 144 which indicate either a pass or fail with respect to signals on inputs 1, 2 and 3. Truth table 98 may be combined with truth table 99 of FIG. 3. This combination results in a truth table 100 in FIG. 9 comparing inputs 1, 2 and 3 relative to output 75 of multiplexer 58 and relative to output 65 of multiplexer 68. Thus, if a pass is on input 1, and any signal is on inputs 2 and 3 of signal selector 56, then input 71 will be ported by multiplexer 58 as output 75 and input 81 will be ported by multiplexer 68 as output 65. If input 2 has a pass, input 1 is a fail and any signal is on input 3, then input 72 is ported by multiplexer 58 as output 75 and input 82 is ported by multiplexer 68 as output 65. If input 3 is a pass and inputs 1 and 2 are a fail, then input 73 is ported by multiplexer 58 as output 75 and input 83 is ported by multiplexer 68 as output 65. If all inputs 1, 2 and 3 are fails, then input 74 is ported by multiplexer 58 as output 75 and input 84 is ported by multiplexer 68 as output 65. If input 1 is a pass, then it is of no consequence what inputs 2 and 3 are, and if input 2 is a pass, then it is of no consequence what input 3 is. Multiplexer signal selector circuit 56 activates signal lines 60 and 61 in a hierarchical ordering sequence such that multiplexers 58 and 68 will select inputs according to the input having the lowest number 71, 81, or 72, 82, or 73, 83, respectively, that is present according to the respective monitor 144 output. If none of the signals are present on inputs 1, 2 or 3, then multiplexers 58 and 68 will select the fourth input 74 and 84, respectively.

Figure 10:
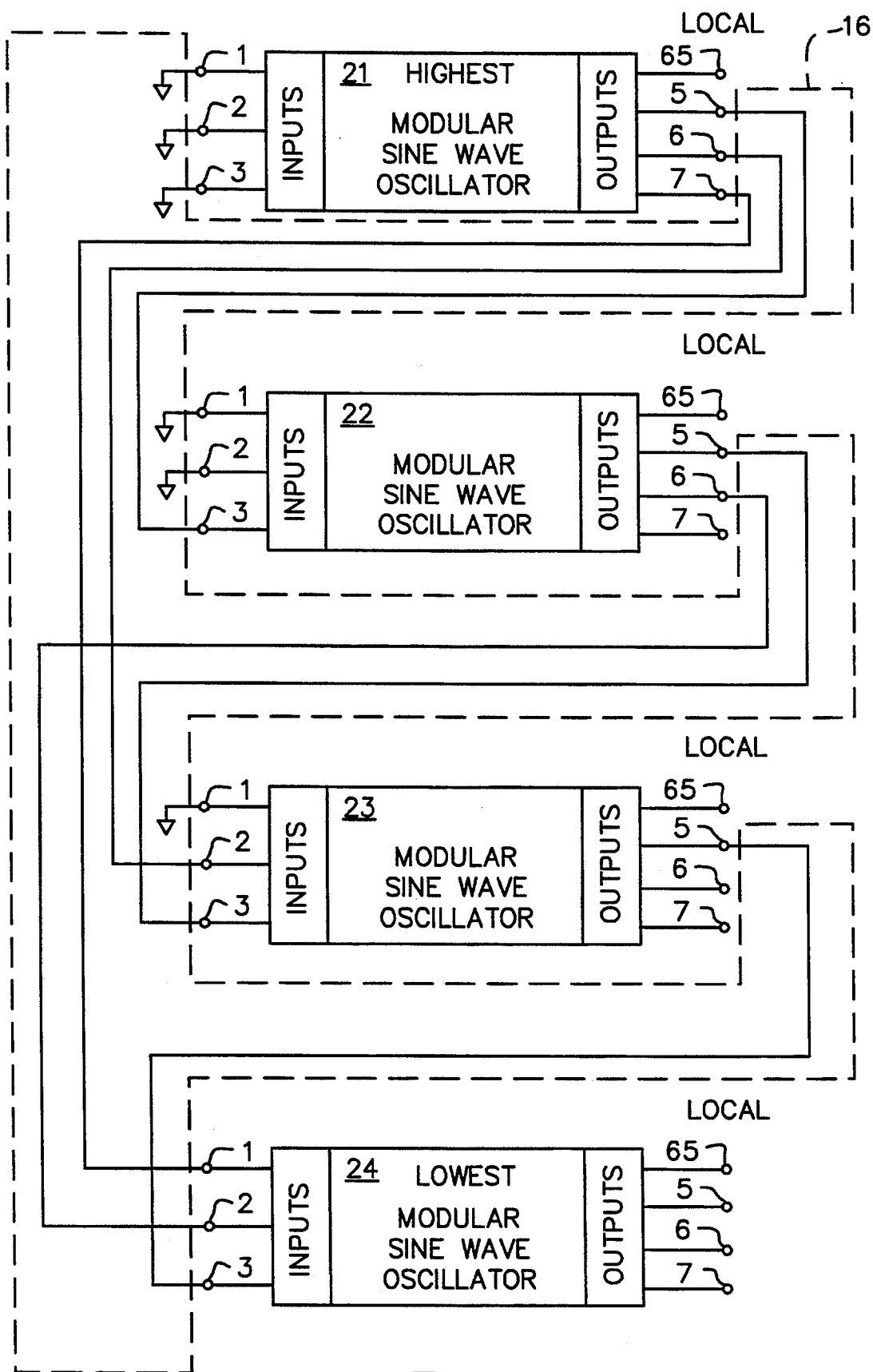
FIG. 10 reveals the interconnection among the sine wave oscillators for a quadruplex ensemble.

FIG. 10 is a wiring diagram of coherence cross-strap 16. The wiring shows all of inputs 1, 2 and 3 grounded to modular sine wave oscillator 21 of channel 11. This means that channel 11 is the master channel because its multiplexer signal selector circuit 56 does not find any input signals present and thus selects input 74, which is of a fixed reference voltage 54, for output 75 of multiplexer 58, which goes on through low-pass filter 76 which, in turn, puts voltage-controlled crystal oscillator 77 at mid-range. Channel 12 has two of its inputs to modular sine wave oscillator 22 grounded and its third input to oscillator 22 connected to an output provided by modulator sine wave oscillator 21 of channel 11. Multiplexer signal selector circuit 56 of oscillator 22 does not have an input on its first two inputs and thereby selects input 73 from oscillator 21 of channel 11 if it is present or else selector circuit 56 selects reference voltage input 74 and channel 12 becomes the master if channel 11 has failed. In a similar matter, channel 13 has only one of its inputs grounded. Channel 11 will be selected if it is present, then channel 12, if channel 11 fails, and channel 13 will be selected along with its internal reference voltage 54 and input 74 if both channels 11 and 12 fail. Channel 14 has none of its inputs to modular sine wave oscillator 24 grounded, thus selector 56 down selects from channel 11 to channel 12 to channel 13 and to its own internal reference voltage 54 via input 74 at multiplexer 58 depending on which signal it finds present.

The outputs 5, 6 and 7 of the four sine wave oscillators 21, 22, 23 and 24 are coherent because the phase detector/low pass filter circuit 76 adjusts the voltage controlled crystal oscillator in the slave units to make the remaining sine wave oscillators track the output of the master sine wave oscillator.

Figure 11:
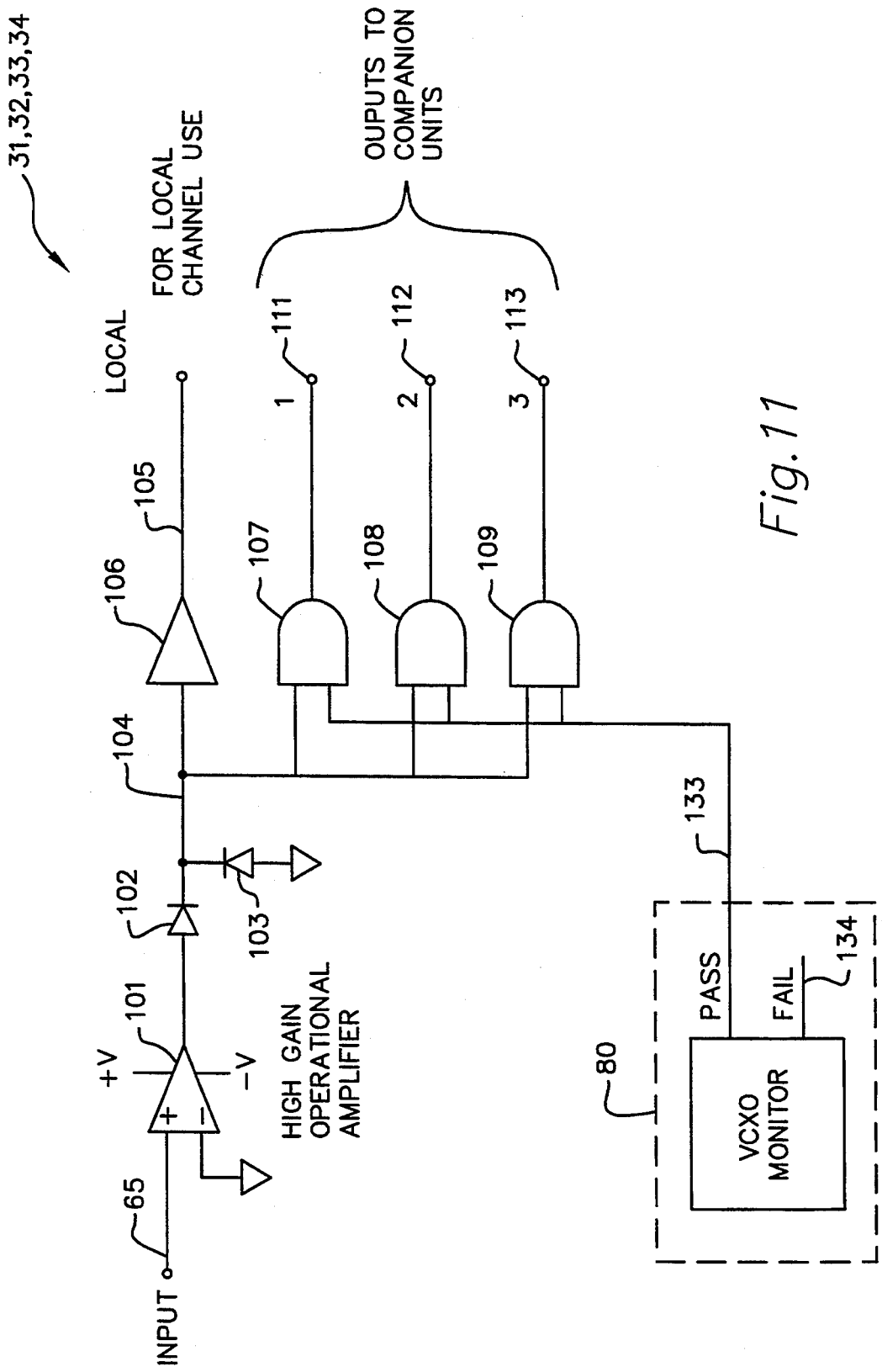
FIG. 11 is a diagram of the squaring circuit.

The coherent sine waves that are present in each of the channels 11, 12, 13 and 14 as they are output by modular sine wave oscillators 21, 22, 23 and 24, respectively, are squared up by signal processors or squaring circuits 31, 32, 33 and 34 having circuit details that are illustrated by circuit 31, 32, 33, 34 of FIG. 11. The squared-up signals from squaring circuits 31, 32, 33 and 34, are converted to logic levels that are compatible with the target application of two-fault tolerant clock 10. The logic signals are shared among the four channels 11, 12, 13 and 14 and voted by voters 41, 42, 43 and 44, respectively, to provide coherent square waves at each channel's output. The frequency and phase of the square waves must match the frequency and phase of their originating sine waves since there are not any failures that could cause them to be otherwise.

Squaring circuit 31, 32, 33, 34 of FIG. 11 has a high-gain operational amplifier 101 that operates in open loop to provide an abrupt output level change as input signal 65 which is local output signal 65 of the sine wave oscillator of the same channel, reverses polarity. Steering diodes 102 and 103 insure that output 104 is either zero volts to represent a logical zero or some appropriate positive voltage that represents the logical one. Circuit 31, 32, 33, 34 has four outputs, a local output 105 for local channel use, and three other outputs 111, 112 and 113 for cross-strapping by cross-strap 18, voters 41, 42, 43 and/or 44 of other companion channels. Output 104 is passed through buffer 106 to match the delay introduced into companion outputs 111, 112 and 113 by logical AND gates 107, 108 and 109, respectively, in each signal path. Output 104 is AND-gated with pass 133 output of monitor 80. Gates 107, 108 and 109 insure that signals supplied to companion units via outputs 111, 112 and 113, are of the proper frequency as ascertained by monitor circuit 80.

Figure 12:
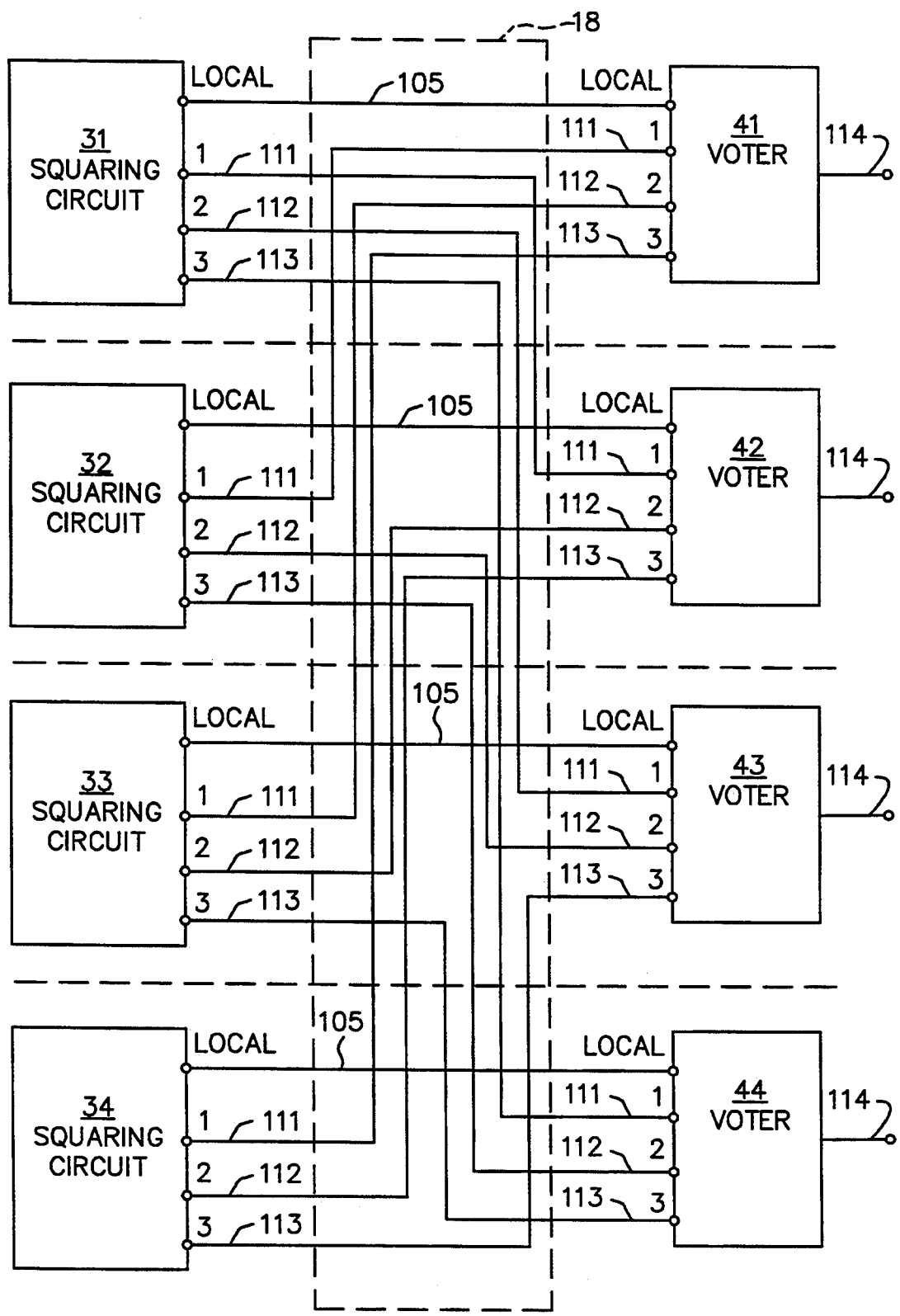
FIG. 12 shows the interconnection layout for the squaring and voter circuits for a quadruplex ensemble.

FIG. 12 shows the wiring of voter cross-strap 18. Voter cross-strap 18 interconnects squaring circuits 31, 32, 33 and 34 with voter circuits 41, 42, 43 and 44 for four-channel clock 10. Squaring circuit 31 has local output 105 connected to local input 105 of voter 41, output 111 to input 111 of voter 42, output 112 to input 111 of voter 43 and output 113 to input 111 of voter 44. Of squaring circuit 32, output 111 goes to input 111 of voter 41, output 112 goes to input 112 of voter 43 and output 113 goes to input 112 of voter 44. Of squaring circuit 33, output 111 goes to input 112 of voter 41, output 112 goes to input 112 of voter 42, and output 113 goes to input 113 of voter 44. Of squaring circuit 34, output 111 goes to input 113 of voter 41, output 112 goes to input 113 of voter 42 and output 113 goes to input 113 of voter 43. The local outputs 105 of squaring circuits 31, 32, 33 and 34 go to inputs 105 of voter 41, 42, 43 and 44, respectively.

Figure 13:
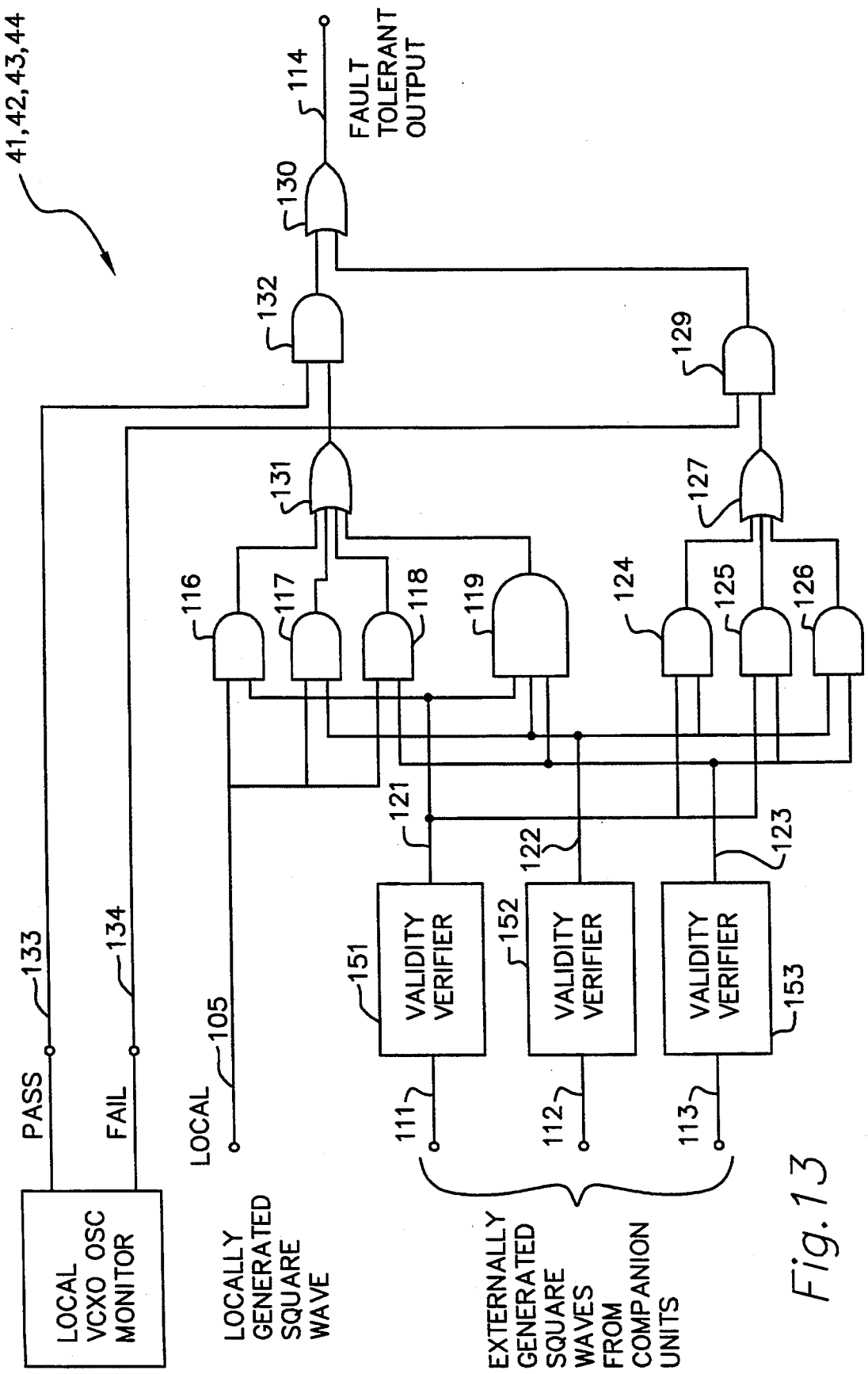
FIG. 13 is a schematic of the voter.

FIG. 13 shows voter circuit 41, 42, 43, 44, which is present in each of channels 11, 12, 13 and 14 of fault tolerant clock 10. Voter circuit 41, 42, 43, 44 combines the locally generated square wave at input 105 from local squaring circuit 31, 32, 33, 34 and the square waves at inputs 111, 112 and 113 from companion unit squaring circuits 31, 32, 33 and/or 34. The square waves are either present and coherent, or else absent due to not meeting provisions of monitor 80, included in each squaring circuit 31, 32, 33, 34. The locally generated square wave on input 105, and at least one other square wave on input 111, 112 or 113 must be present to produce an output 114 if the local signal at input 105 is deemed to be good by the channel's internal monitor 80, or else at least two companion signals must be present on inputs 111, 112 and/or 113 when the local square wave is deemed to be bad on input 105, in order to produce an output 114. An alternate success path is provided when a local unit is deemed to be good by a concurrence of the other three companion units. This alternate path provides a fully coherent square wave at output 114 in the event that the local unit signal at 105 has momentarily lost coherence. Each of the externally generated square waves from companion units to inputs 111, 112 and 113, respectively, must pass successfully through an individual validity verifier circuit 151, 152 or 153. Thus, a total of three validity verifiers 151, 152 and 153 are needed per voter 41, 42, 43, 44.

A validity verifier circuit 151, 152 and 153, respectively, is provided in each of companion input signal lines 111, 112 and 113 to insure that the signal appearing on the respective line is periodic. That is, the lack of activity at input 111, 112 or 113 causes the output of the respective verifier circuit to be continuously low. On the other hand, activity at input 111, 112 or 113 causes the output at 121, 122 or 123, respectively, of verifier circuit 151, 152 or 153, to be the same as the input at 111, 112 or 113.

In circuit 41, 42, 43, 44 of FIG. 13, local input 105 goes to AND gates 116, 117 and 118. Output 121 of verifier 151 goes to AND gates 116, 119, 124 and 125. Output 122 of verifier 152 goes to AND gates 117, 119, 124 and 126. Output 123 of verifier 153 goes to AND gates 118, 119, 125 and 126. The outputs of AND gates 116, 117, 118 and 119 go to OR gate 131. The outputs of AND gates 124, 125 and 126 go to OR gate 127. The output of OR gate 131 goes to AND gate 132. The output of OR gate 127 goes to AND gate 129. Pass output 133 from local monitor 80 goes to AND gate 132 and fail output 134 from local monitor 80 goes to AND gate 129. The output of AND gate 132 and the output from AND gate 129 go to OR gate 130. The fault tolerant clock output of the respective channels 11, 12, 13 and 14 are at output 114 of OR gate 130 of the respective voters 41, 42, 43 and 44.

Figure 14:
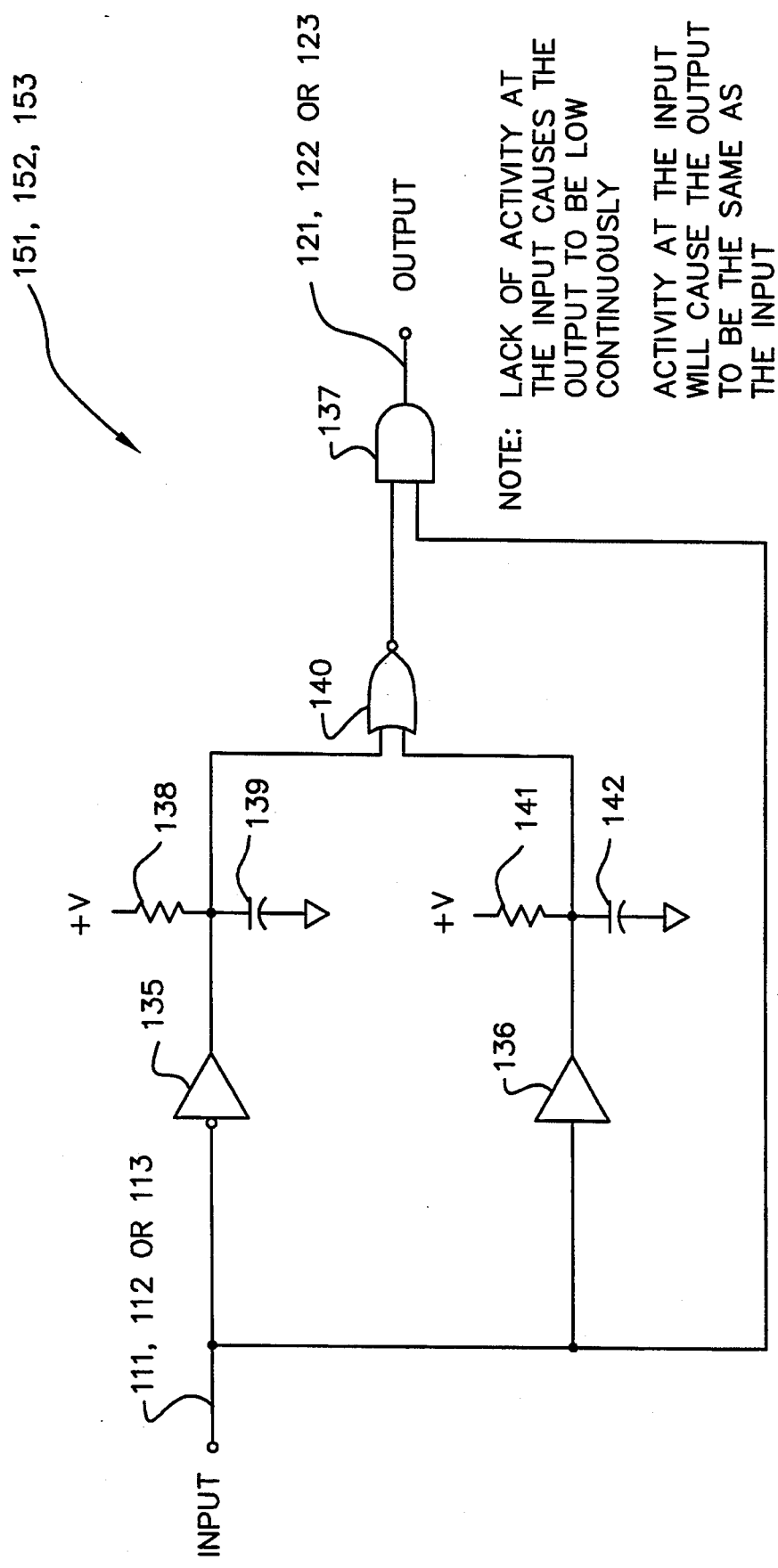
FIG. 14 is a schematic of the validity verifier circuit.

FIG. 14 shows the circuit of signal or validity verifier 151, 152, 153. Input 111, 112 or 113 goes to inverting buffer 135, non-inverting buffer 136 and AND gate 137. Output of buffer 135 goes to a resistor-capacitor (RC) network and is connected to a junction of resistor 138 and capacitor 139 of the network. The other end of resistor 138, not connected to the output of buffer 135, is connected to a positive voltage source, and the other end of capacitor 139, not connected to the output of buffer 135, is connected to a reference or ground terminal. The output of buffer 135 is also connected to a NOR gate 140. The output of non-inverting gate 136 is connected to a resistor-capacitor network at the junction of resistor 141 and capacitor 142 of the network. The end of resistor 141, not connected to the output of buffer 136, is connected to a positive voltage source. The end of capacitor 142, not connected to the output of buffer 136, is connected to a reference or ground terminal. The output of buffer 136 is also connected to NOR gate 140. The output of gate 140 is connected to AND gate 137. The connection of output 121, 122 or 123 of gate 137 is illustrated in voter circuit 41, 42, 43, 44 of FIG. 13. Signals to the two resistor-capacitor networks of resistors 138 and 141, and capacitors 139 and 142, are periodically reset in order to prevent capacitors 139 and 142 from achieving a charge sufficiently high to appear as a logical one to NOR gate 140 thereby causing the output of gate 140 to go to a logical zero. Capacitors 139 and 142 are prevented from charging up by virtue of being periodically discharged as a result of the square wave appearing on inputs 111, 112 or 113 of buffer 136 and inverter 135. Capacitor 139 or 142 reaches a full charge if input 111, 112 or 113 becomes stuck at either a logical zero or one, respectively. The RC time constants of resistor 138 and capacitor 139, and resistor 141 and capacitor 142, are set to a value that is appropriate for the frequency of the square wave that circuit 151, 152, 153 is verifying. The square wave is allowed to pass through voter circuit 41, 42, 43, 44 via AND gate 137 provided that the output of gate 140 is at a logical one. Output 121, 122 or 123 through voter circuit 41, 42, 43, 44 is kept at a logical zero if the square wave to input 111, 112 or 113, does not toggle correctly.

I claim:

1. A multiple-channel fault-tolerant clock system comprising:

plurality of clock means for providing fault-tolerant clock signal outputs, wherein each clock means comprises:

voltage-controlled oscillator means for providing a sine wave signal;

squaring means, connected to said oscillator means, for squaring the sine wave signal;

a phase comparator means, connected to said oscillator means and to the remaining clock means of said plurality of clock means, for providing a voltage-output to control the phase and frequency of said voltage-controlled oscillator; and voting means, connected to said squaring means, for assessing conditions and providing a fault-tolerant clock signal outputs if conditions are satisfactory;

first interconnecting means for interconnecting said oscillator means of said plurality of clock means; and second interconnecting means for interconnecting said squaring means and said voting means; and wherein:

each clock means of said plurality of clock means has a hierarchical order designation, respectively, as a first clock means, second clock means, third clock means, and so on;

the first clock means of said plurality of clock means functions as a master and the remaining clock means of said plurality of clock means to slave to the master coherently in frequency and phase;

failure of the first clock means functioning as the master results in the second clock means of the remaining clock means to function as the master and the remaining clock means to slave to the master coherently in frequency and phase;

the output of the failed first clock means may output a clock signal from the second clock means functioning as the master; and failure of the second clock means functioning as the master results in the third clock means of the remaining clock means to function as the master and the remaining clock means slave to the master coherently in frequency and phase;

the output of the failed first and second clock means may output a clock signal from the third clock means functioning as the master; and each clock means of said plurality of clock means is independently powered such that a power failure of one clock means does not necessarily affect the remaining clock means.

2. A multiple-channel fault-tolerant clock system comprising:

a plurality of clock channels;

wherein each clock channel comprises:

a sine wave oscillator;

a squaring circuit connected to said sine wave oscillator; and a voter connected to said squaring circuit;

a first interconnecting network connected to said sine wave oscillators of said plurality of clock channels; and a second interconnecting network connected to said squaring circuits and said voters of said plurality of clock channels; and wherein:

each clock channel has the other clock channels of said plurality of clock channels as companion clock channels;

each said sine wave oscillator comprises:
- a plurality of phase/frequency comparators connected to sine wave oscillators of said companion channels;
- a reference voltage source;
- a first multiplexer connected to said plurality of phase/frequency comparators and to said reference voltage source;
- a filter connected to said first multiplexer;
- a voltage controlled oscillator connected to said filter and to said plurality of phase/frequency comparators;
- a voltage controlled oscillator monitor connected to said voltage controlled oscillator;
- a second multiplexer, connected to said voltage controlled oscillator, having an output;
- a multiplexer signal selector connected to sine wave oscillators of said companion channels, and to first and second multiplexers;
- a plurality of buffers connected to said voltage controlled oscillators of said companion channels and to said voltage controlled oscillator; and
- a delay circuit connected to said voltage controlled oscillator and to said second multiplexer.

3. The clock system of claim 2 wherein each said squaring circuit comprises:
- a high gain amplifier connected to the output of said second multiplexer;
- a diode network connected to said high gain amplifier;
- a buffer connected to said diode network and having an output; and
- a plurality of AND gates wherein each AND gate has a first input connected to said diode network, has a second input connected to said voltage controlled oscillator monitor and having an output connected to a companion clock channel of said plurality of clock channels.

4. The clock system of claim 3 wherein each said voter comprises:
- a first plurality of AND gates, each AND gate having a first input connected to said buffer of said squaring circuit, and having a second input;
- a plurality of validity verifiers, each said validity verifier connected to a second input of each said AND gate of said first plurality of AND gates on a one-to-one basis, and each said validity verifier connected to a buffer of a squaring circuit of a companion clock channel of said plurality of clock channels;
- a first single AND gate having a plurality of inputs, each input connected to a validity verifier of said plurality of validity verifiers;
- a second plurality of AND gates, each AND gate having at least one input connected to at least one validity verifier of said plurality of validity verifiers;
- a first OR gate connected to said first plurality of AND gates and to said first single AND gate;
- a second OR gate connected to said second plurality of AND gates;
- a second single AND gate connected to said first OR gate and to said voltage controlled oscillator monitor of said sine wave oscillator;
- a third single AND gate connected to said second OR gate and to said voltage controlled oscillator monitor of said sine wave oscillator; and
- a third OR gate, connected to said second and third single AND gates, having an a fault-tolerant clock output.

5. The clock system of claim 4 wherein:

said first interconnecting network interconnects said sine wave oscillator of each said clock channel to said sine wave oscillator of each said companion clock channel of said plurality of clock channels; and said second interconnecting network interconnects said squaring circuit of each clock channel to said voter of each said companion clock channel of said plurality of clock channels.

6. A multiple-channel fault-tolerant clock system comprising:

a plurality of clocks:

wherein each clock comprises:
- a signal generator;
- a phase detector connected to aid generator; and
- a voter connected to said oscillator;

a first cross-strap connected to said generators of said plurality of clocks; and a second cross-strap connected to said voters of said plurality of clocks; and wherein:

said plurality of clocks comprises N clocks;

N is a total number of clocks;

said generators are interconnected by said first cross-strap and said voters are interconnected by said second cross-strap, such that a first clock functions as a master clock to slave second through Nth clocks as slave clocks, the second clock functions as a master clock to slave third through Nth clocks as slave clocks if the first clock fails, the third clock functions as a master clock to slave fourth through Nth clocks as slave clocks if the first and second clocks fail, and an (M+1)th clock functions as a master clock to slave (M+2)th through Nth clocks as slave clocks if the first through Mth clocks fail;

M is a number of failed clocks;

said generators are voltage-controlled;

any said clock functioning as a slave clock to the master clock, outputs a clock signal having a phase and frequency approximately equal to a phase and frequency of a clock signal output by the master clock;

the phase and frequency a clock signal of the any said clock functioning as a slave clock is determined by a voltage output of the phase detector of the any said clock;

the phase detector of the any said clock functioning as a slave clock is connected to the master clock;

the voltage output of the phase detector of the any said clock functioning as a slave clock, is indicative of the phase and frequency of the clock signal of the master clock; and the clock signal of the master clock is a function of a reference voltage.

7. The multiple-channel fault-tolerant clock system of claim 6 wherein each said signal generator of said plurality of clocks comprises:
- a sine-wave oscillator; and a squaring circuit connected to said sine-wave oscillator.

8. The multiple-channel fault-tolerant clock of claim 7 wherein each clock is independently powered such that a power failure of one clock does not necessarily affect the remaining clocks of said plurality of clocks.

9. A two-fault-tolerant four-channel clock system comprising:

a first clock;
a second clock connected to said first clock;
a third clock connected to said first and second clocks; and
a fourth clock connected to said first second and third clocks; and
wherein:
one clock is a master to which the remaining clocks slave, and in case of a failed clock such as a master, one of the remaining clocks becomes a master to which other clocks slave;
said first clock comprises:
  a first oscillator;
  a first signal processor connected to said first oscillator; and
  a first voter connected to said first signal processor;
said second clock comprises:
  a second oscillator connected to said first oscillator;
  a second signal processor connected to said second oscillator and to said first voter; and
  a second voter connected to said first and second signal processors;
said third clock comprises:
  a third oscillator connected to said first and second oscillators;
  a third signal processor connected to said third oscillator, and to said first and second voters;
  a third voter connected to said first, second and third signal processors;
said fourth clock comprises:
  a fourth oscillator connected to said first, second and third oscillators;
  a fourth signal processor connected to said fourth oscillator, and to said first, second and third voters; and
  a fourth voter connected to said first, second, third and fourth signal processors;
said first oscillator has first, second and third inputs connected to a ground reference and first, second, third and fourth outputs;
said second oscillator has first and second inputs connected to the ground reference, a third input connected the third output of said first oscillator, and has first, second, third and fourth outputs;
said third oscillator has a first input connected to the ground reference, a second input connected to the second output of said first oscillator, a third input connected to the first output of said second oscillator, and has first, second, third and fourth outputs;
said fourth oscillator has a first input connected to the third output of said first oscillator, a second input connected to the second output of said second oscillator, a third input connected to the first output of said third oscillator, and has first, second, third and fourth outputs;
said first oscillator, when functioning appropriately, is a master oscillator and said second, third and fourth oscillators slave to said first oscillator;

said second oscillator, when functioning appropriately and in absence of an appropriately functioning said first oscillator, is the master oscillator and said second, third and fourth oscillators slave to said second oscillator;
said third oscillator, when functioning appropriately and in absence of appropriately functioning said first and second oscillators, is the master oscillator and said fourth oscillator slaves to said third oscillator;
said fourth oscillator, when functioning appropriately and in absence of appropriately functioning said first, second and third oscillators, is the master oscillator;
said first oscillator comprises:
  signal selection means, connected to the first, second and third inputs of said first oscillator, for selecting a satisfactory signal from the first, second or third input, in that order, or a reference voltage in absence of a satisfactory signal;
  a filter means, connected to said signal selection means, for filtering a selected satisfactory signal or reference voltage; and
  voltage-controlled signal generating means, having an input connected to said filter means and an output connected the first, second, third and fourth outputs of said first oscillator, for generating a signal that slaves to the selected satisfactory signal or adjusts in accordance to the reference voltage;
said second oscillator comprises:
  signal selection means, connected to the first, second and third inputs of said second oscillator, for selecting a satisfactory signal from the first, second or third input, in that order, or a reference voltage in absence of a satisfactory signal;
  a filter means, connected to said signal selection means, for filtering a selected satisfactory signal or reference voltage; and
  voltage-controlled signal generating means, having an input connected to said filter means and an output connected the first, second, third and fourth outputs of said second oscillator, for generating a signal that slaves to the selected satisfactory signal or adjusts in accordance to the reference voltage;
said third oscillator comprises:
  signal selection means, connected to the first, second and third inputs of said third oscillator, for selecting a satisfactory signal from the first, second or third input, in that order, or a reference voltage in absence of a satisfactory signal;
  a filter means, connected to said signal selection means, for filtering a selected satisfactory signal or reference voltage; and
  voltage-controlled signal generating means, having an input connected to said filter means and an output connected the first, second, third and fourth outputs of said third oscillator, for generating a signal that slaves to the selected satisfactory signal or adjusts in accordance to the reference voltage; and
said fourth oscillator comprises:
  signal selection means, connected to the first, second and third inputs of said fourth oscillator, for selecting a satisfactory signal from the first, second or third input, in that order, or a reference voltage in absence of a satisfactory signal;

a filter means, connected to said signal selection means, for filtering a selected satisfactory signal or reference voltage; and voltage-controlled signal generating means, having an input connected to said filter means and an output connected the first, second, third and fourth outputs of said fourth oscillator, for generating a signal that slaves to the selected satisfactory signal or adjusts in accordance to the reference voltage.

10. The four-channel clock system of claim 9 wherein said first, second, third and four clocks are independently powered.

11. The four-channel clock system of claim 9 wherein:

said first signal has an input connected to the fourth output of said first oscillator and has first, second, third and fourth outputs;

said second signal processor has an input connected to the fourth output of said second oscillator and has first, second, third and fourth outputs;

said third signal processor has an input connected to the fourth output of said third oscillator and has first, second, third and fourth outputs; and said fourth signal processor has an input connected to the fourth output of said fourth oscillator and has first, second, third and fourth outputs.

12. The four-channel clock system of claim 11 wherein:

said first voter comprises:
- a first input;
- a first signal verifier, connected to the first input, for indicating whether there is an active signal, and if so, then passing the active signal;
- a second input;
- a second signal verifier, connected to the second input, for indicating whether there is an active signal, and if so, then passing the active signal;
- a third input;
- a third signal verifier, connected to the third input, for indicating whether there is an active signal, and if so, then passing the active signal;
- a fourth input;
- an output; and
- AND/OR logic means, connected to the output and to the first, second and third signal verifiers, for selecting a signal from the fourth input if the signal is satisfactory and if at least two signal verifiers pass an active signal, and for selecting an active signal from one of the signal verifiers if the signal from the fourth input is not satisfactory and if at least two signal verifiers pass an active signal so as to pass a fault tolerant clock signal to the output;

said second voter comprises:
- a first input;
- a first signal verifier, connected to the first input, for indicating whether there is an active signal, and if so, then passing the active signal;
- a second input;
- a second signal verifier, connected to the second input, for indicating whether there is an active signal, and if so, then passing the active signal;
- a third input;
- a third signal verifier, connected to the third input, for indicating whether there is an active signal, and if so, then passing the active signal;
- a fourth input;
- an output; and
- AND/OR logic means, connected to the output and to the first, second and third signal verifiers, for selecting a signal from the fourth input if the signal is satisfactory and if at least two signal verifiers pass an active signal, and for selecting an active signal from one of the signal verifiers if the signal from the fourth input is not satisfactory and if at least two signal verifiers pass an active signal so as to pass a fault tolerant clock signal to the output;

said third voter comprises:
- a first input;
- a first signal verifier, connected to the first input, for indicating whether there is an active signal, and if so, then passing the active signal;
- a second input;
- a second signal verifier, connected to the second input, for indicating whether there is an active signal, and if so, then passing the active signal;
- a third input;
- a third signal verifier, connected to the third input, for indicating whether there is an active signal, and if so, then passing the active signal;
- a fourth input;
- an output; and
- AND/OR logic means, connected to the output and to the first, second and third signal verifiers, for selecting a signal from the fourth input if the signal is satisfactory and if at least two signal verifiers pass an active signal, and for selecting an active signal from one of the signal verifiers if the signal from the fourth input is not satisfactory and if at least two signal verifiers pass an active signal so as to pass a fault tolerant clock signal to the output; and said fourth voter comprises:
- a first input;
- a first signal verifier, connected to the first input, for indicating whether there is an active signal, and if so, then passing the active signal;
- a second input;
- a second signal verifier, connected to the second input, for indicating whether there is an active signal, and if so, then passing the active signal;
- a third input;
- a third signal verifier, connected to the third input, for indicating whether there is an active signal, and if so, then passing the active signal;
- a fourth input;
- an output; and
- AND/OR logic means, connected to the output and to the first, second and third signal verifiers, for selecting a signal from the fourth input if the signal is satisfactory and if at least two signal verifiers pass an active signal, and for selecting an active signal from one of the signal verifiers if the signal from the fourth input is not satisfactory and if at least two signal verifiers pass an active signal so as to pass a fault tolerant clock signal to the output; and wherein:

said first voter has the first input connected to the first output of said second signal processor, the second input connected to the first output of said third signal processor, the third input connected to the first output of said fourth signal processor, and the fourth input connected to the fourth output of said first signal processor;

said second voter has the first input connected to the first output of said first signal processor, the second input connected to the second output of said third signal processor, the third input connected to the second output of said fourth signal processor, and the fourth input connected to the fourth output of said second signal processor;

said third voter has the first input connected to the second output of said first signal processor, the second input connected to the second output of said second signal processor, the third input connected to the third output of said fourth signal processor, and the fourth input connected to the fourth output of said third signal processor; and said fourth voter has the first input connected to the third output of said first signal processor, the second input connected to the third output of said second signal processor, the third input connected to the third output of said third signal processor, and the fourth input connected to the fourth output of said fourth signal processor.

* * * * *